S. DUDA.
DIRECTION SIGNAL FOR AUTOMOBILES.
APPLICATION FILED MAR. 30, 1915.

1,151,168.

Patented Aug. 24, 1915.
3 SHEETS—SHEET 1.

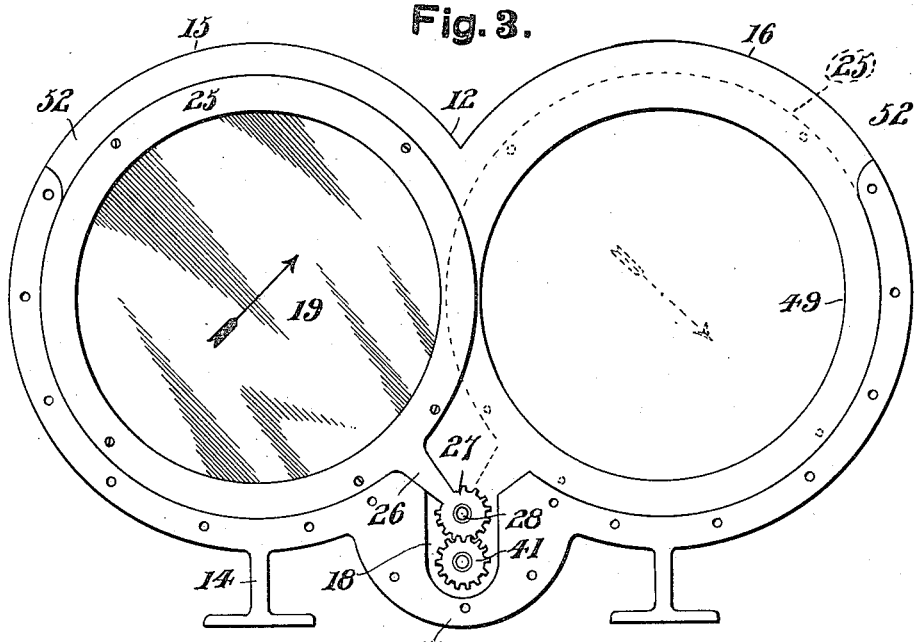
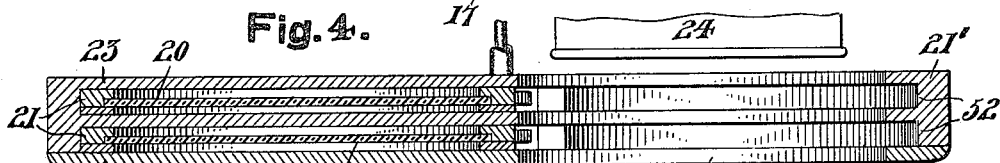
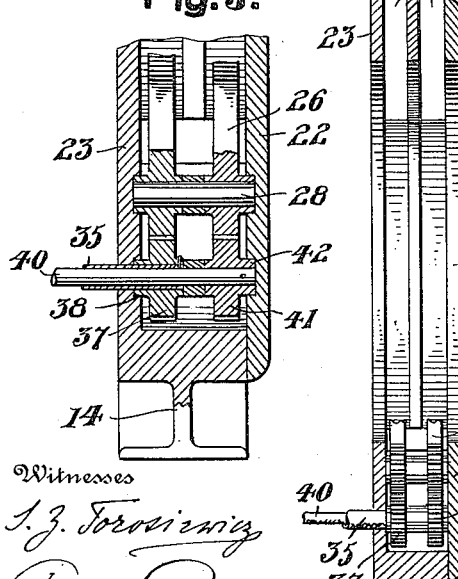
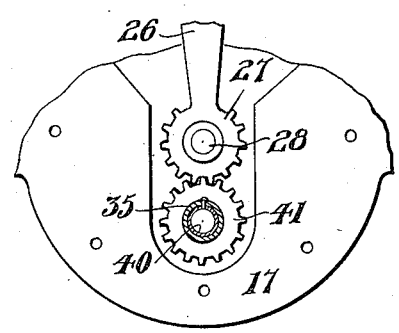

S. DUDA.
DIRECTION SIGNAL FOR AUTOMOBILES.
APPLICATION FILED MAR. 30, 1915.

1,151,168.

Patented Aug. 24, 1915.
3 SHEETS—SHEET 3.

Witnesses
S. Z. Torosiewicz
T. N. L. Bryant

Inventor.
S. Duda

By A. M. Wilson
Attorney

UNITED STATES PATENT OFFICE.

STANISLAW DUDA, OF LODI, NEW JERSEY.

DIRECTION-SIGNAL FOR AUTOMOBILES.

1,151,168.  Specification of Letters Patent.  Patented Aug. 24, 1915.

Application filed March 30, 1915. Serial No. 18,001.

*To all whom it may concern:*

Be it known that I, STANISLAW DUDA, a subject of the Emperor of Austria-Hungary, residing at Lodi, in the county of Bergen and State of New Jersey, have invented certain new and useful Improvements in Direction-Signals for Automobiles, of which the following is a specification.

This invention relates to certain new and useful improvements in direction signals for automobiles.

A primary object of the invention is to provide signal means positioned forwardly of the automobile and shiftable from the driver's seat whereby the intended course of travel of the vehicle is visually indicated for the information of the public.

A further object is to provide different colored glass screens readily shiftable in front of the automobile head light whereby the driver may show at will either a red or a green light which will indicate that the vehicle is about to turn toward the right or the left.

It is further contemplated that the display of a red glass or screen shall denote an intention on the part of the driver of turning the vehicle toward the right, while the display of a green screen indicates an intended left-hand turn and the invention provides a readily shiftable screen of each of these colors for indicating such intended turns whether displayed in the day time or in front of a lighted lamp in the night time.

With these general objects in view and others that will appear as the nature of the invention is better understood, the same consists in the novel combination and arrangement of parts hereinafter more fully described, illustrated in the accompanying drawings and pointed out in the appended claims.

Figure 1:
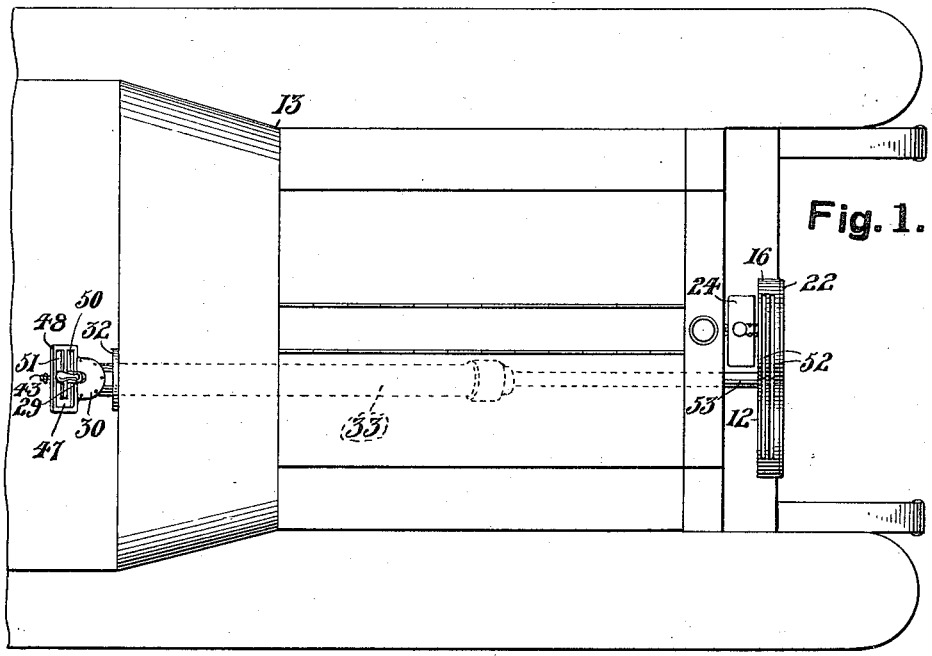
Figure 2:
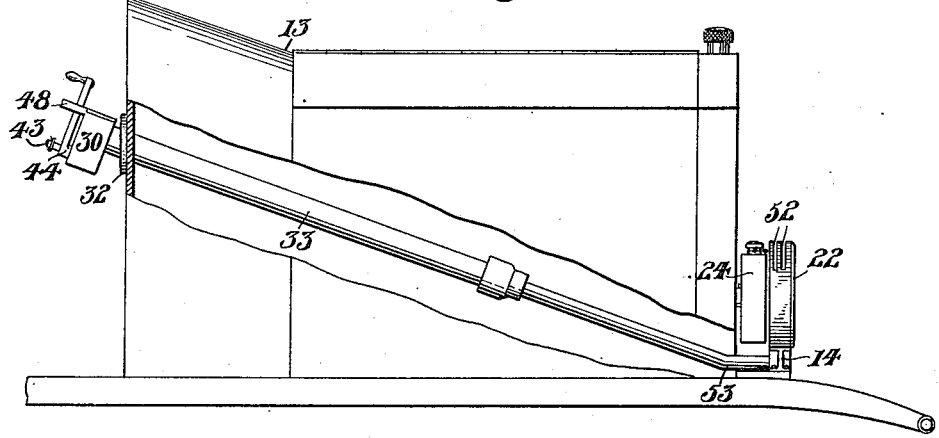
Figure 8:
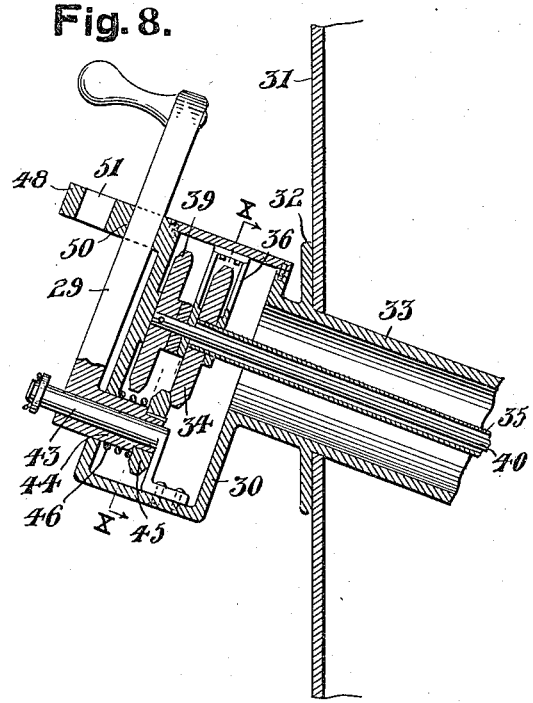
Figure 10:
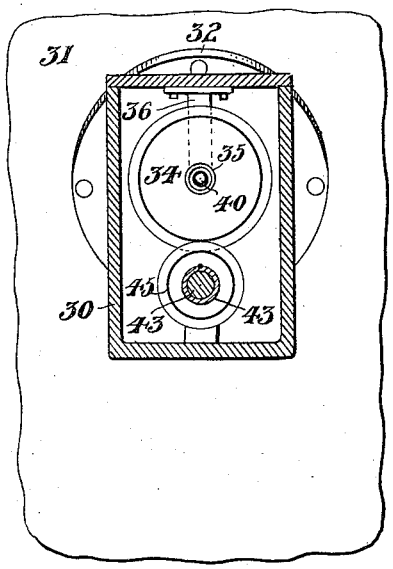
Figure 9:
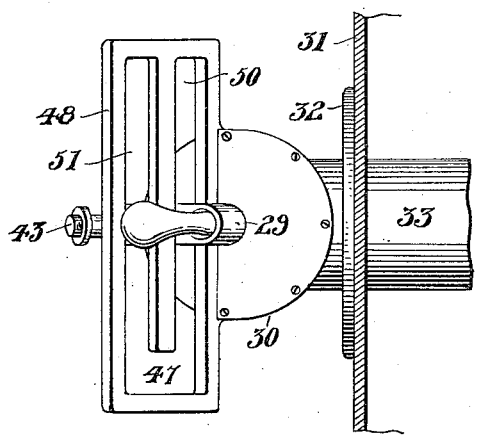
Figure 11:
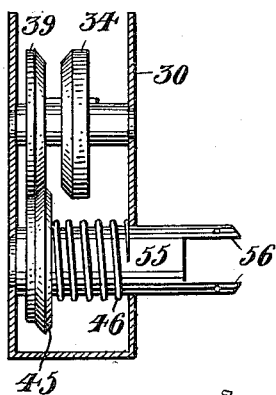

In the drawings forming a part of this application and in which like-designating characters refer to corresponding parts throughout the several views, Figure 1 is a top plan view of the forward portion of an automobile with the present invention installed thereon. Fig. 2 is a side elevation thereof with a portion of the automobile broken away. Fig. 3 is a front elevation of the signal portion of the device with the front plate removed therefrom. Fig. 4 is a central transverse horizontal sectional view thereof with the front plate in position. Fig. 5 is a vertical detail sectional view showing the gearing for the shiftable signal members. Fig. 6 is a central vertical sectional view of Fig. 3. Fig. 7 is an enlarged front elevation of the lower central portion of the signal casing. Fig. 8 is a central vertical sectional view of the actuating means attached to the dash-board. Fig. 9 is a top plan view thereof, and Fig. 10 is a transverse sectional view taken upon line X—X of Fig. 8. Fig. 11 is a sectional view of a modification of the actuating means shown in Fig. 8.

Referring more in detail to the drawings, the invention broadly consists of a signal casing 12 mounted upon the forward portion of the automobile 13 by means of brackets 14, the said casing being formed in two similar circular parts, the one part designated as 15 being closed on its front and rear sides, while the other part or portion 16 of the casing is in the form of an annulus and has an open front and rear side or face. The complete signal casing 12 is substantially the shape of the figure 8 and has a depending central projection 17 provided with an inner chamber 18.

Circular screens of red and green glass 19 and 20 respectively are adapted to normally rest side by side in the circular pockets 21 of the casing portion 15 and closed from view forwardly of the automobile by means of the front plate 22 of the casing, while the said casing portion has a closed rear wall or plate 23. The casing portion 16 is also provided with similar pockets 21' adapted for receiving the screens when the same are shifted to a position therein by the mechanism hereinafter described. It will thus be noted that when either one of the screens 19 or 20 is shifted from its normal position in the casing portion 15 to its operative position in the portion 16 such screen will be directly in front of the automobile head light 24, so that in the night time, while the head light will normally project the usual white light, the same will be projected through either a red or a green screen whenever desired, which changes of color will denote an intended turn to either the right or to the left. The screens are each mounted in similar circular frames 25 and these frames are each provided with an arm 26 having a gear 27 secured at its free end, the respective gears of the two arms being journaled side by side upon a transverse shaft 28 within the extension chamber 18 as best illustrated in Fig. 5 of the drawings. The shifting means for the screens is operated by means of a crank 29 mounted upon a gear case 30 secured to the automobile dash board 31 by means of a plate 32 and having a tube 33 extending between the said gear case 30 and the extension chamber 18 of the signal casing.

A friction disk 34 is secured to a power transmitting tube 35 which is slightly flexible although capable of imparting movement by rotation thereof, and such tube is journaled in a bracket 36 within the gear case and extends through the tube 33 into the extension chamber 18 wherein a gear 37 is secured thereto, the said gear being journaled as at 38 in the inner side of the extension 17. Another friction disk 39 is mounted in the gear case 30 and is secured to one end of a power transmission shaft 40 which shaft is slightly flexible and extends through the tube 35 and into the chamber 18 where the same is provided with a gear 41 secured thereon, the said gear being journaled as at 42 in the inner side of the casing plate 22. The gear 27 of the outer or red screen 19 is in constant mesh with the shaft gear 41 whereby any movement of the friction disk 39 of the shaft 40 operates in shifting the red screen. Similarly, the gear 27 of the green screen is in constant mesh with the gear 37 of the operating tube so that any movement of the friction disk 34 will shift the green screen. The crank 29 is journaled upon an axle 43 and has an angular extension 44 within the gear case, while a relatively small friction disk 45 is secured to the inner end of this extension and an expansion spring 46 engages against the front wall of the casing and the disk 45 to normally position the crank substantially central of the base slot 47 of the rack 48 attached to the front wall of the said case.

When the two screens 19 and 20 are normally positioned as illustrated in Fig. 3 of the drawings, the same will be inclosed from view within the casing end portion 15 and the crank 29 will be at the right-hand slotted end of the rack 48. When the driver desires to shift the green screen 20 so that the same will be visible through the front circular opening 49 of the casing portion 16 whether the head light is burning or not being immaterial, he will force the lever 29 forwardly into the forward longitudinal slot 50 of the rack 48 and the disk 45 being then brought in contact with the disk 34 as shown in Fig. 8, a movement of the lever toward the left in the forward slot 50 as illustrated in Fig. 9 will turn the tube 34 and its gear 37 so as to revolve the gear 27 of the green screen in the proper direction to shift said screen from the casing portion 15 to the open portion 16 thereof. It will be seen that a return movement of the lever will again return the green screen within the closed casing portion.

When desired to shift the red screen 19 for the purpose of exposing a red signal within the open case portion 16, the lever will be turned forward engaging the disk 45 with the disk 39 and then moving the lever toward the left slidably in the forward slot 51 of the rack 48 whereupon the shaft 40 will be turned which results in a turning of its gear 41 and the gear 27 of the red screen 19 whereby such screen will be shifted to its receiving pocket 21' in the casing portion 16 and in front of the headlight 24. A return of the lever to its neutral position in the transverse rack slot 47 returns the red screen to its normal inclosed position.

It will be noted that the upper portion of the casing 12 is slotted as at 52 for allowing the free shifting of the screens, while the power shaft 40 and tube 35 are slightly flexible for allowing their successful operation through the slightly bent portion 53 of the tube 33.

It will thus be seen that an easily operated shiftable color signal device is provided which will readily attract the attention of the public in advising them of the intended course of travel of the automobile and thus assisting in preventing accidents during travel.

I have shown a modification in Fig. 11 of the actuating means disclosed in Fig. 8 and such modification includes the casing 30 and friction disks 34 and 39 for shifting the color screens with the operating disk 45 spring pressed as at 46. In this construction, the operating disk 45 is carried by the shaft 55 having a bifurcated outer end 56 for the reception of an operating lever (not shown). This operating lever may be used in lieu of the handle 29 and in combination with a rack segment.

While the forms of the invention herein shown and described are what are believed to be the preferred embodiments thereof, it is nevertheless to be understood that minor changes may be made without departing from the spirit and scope of the invention as set forth in the claims.

What I claim as new is:—

1. A device of the class described comprising a casing having one closed and one open side portion, circular color screens normally positioned in the closed side thereof, gears rigidly secured to the said screens, a gear casing fixed adjacent the dash-board of the automobile, a flexible operating tube having one end within said casing, and the other end operatively engaging the gear of one of said screens, a flexible power shaft extending through said tube and having one end within said casing and its other end operatively engaging the gear of the other one of the said screens, and an operating means carried by said case separately engageable with the shaft and tube ends positioned therein.

2. A device of the class described comprising in combination with an automobile having a head-light thereon, a signal casing substantially 8-shape and having one half thereof closed at its front and rear sides, the other half of said casing being open and positioned forwardly of said head-light, circular signal color screens normally seated within said closed casing portion, gears carried by said screens, operating gears for said screen gears journaled centrally in the lower portion of said casing, a flexible shaft secured to one of said operating gears and a flexible tube telescoping the said shaft and secured to the other one of said operating gears, and actuating means for said tube and shaft positioned adjacent the dashboard of the automobile.

3. A device of the class described comprising in combination with an automobile having a head-light thereon, a signal casing substantially 8-shape and having one half thereof closed at its front and rear sides, the other half of said casing being open and positioned forwardly of said headlight, circular signal color screens normally seated within said closed casing portion, gears carried by said screens, operating gears for said screen gears journaled centrally in the lower portion of said casing, a flexible shaft secured to one of said operating gears and a flexible tube telescoping the said shaft and secured to the other one of said operating gears, a gear casing, similar friction disks secured respectively to the ends of said tube and shaft within said casing, and a crank actuating means for the said disk shiftable and rotatably mounted upon the said case.

4. A device of the class described, comprising in combination with an automobile having a head-light thereon, a signal casing substantially 8-shape and having one-half thereof closed at its front and rear sides, the other half of said casing being open and positioned forwardly of said headlight, circular signal color screens normally seated within said closed casing portion, gears carried by said screens, operating gears for said screen gears journaled centrally in the lower portion of said casing, separate flexible operating means for the said operating gears, separate friction disks upon the free ends of said flexible means, a shiftable actuating friction disk positioned between the aforenamed disks, an operating crank carried by said intermediate friction disk, and a double slotted guide rack for the said crank.

5. A device of the class described comprising in combination with shiftable signal screens, spaced actuating friction disks for the said screens, a guide rack having spaced longitudinal slots therein, a crank having an angular extension and a relatively small friction disk secured to the said angular extension and positioned between the said spaced disks, the said crank being positioned through the said rack and positioned within one of the slots thereof when the intermediate disk is in engagement with one of the said spaced disks.

In testimony whereof I affix my signature in presence of two witnesses.

STANISLAW DUDA.

Witnesses:
 STANISLAW STARCREWSKI,
 JOS. A. MOJEWSKIE.

Copies of this patent may be obtained for five cents each, by addressing the "Commissioner of Patents, Washington, D. C."